(12) United States Patent
Nam (10) Patent No.: US 9,682,658 B2
(45) Date of Patent: Jun. 20, 2017

(54) STEP DEVICE

(71) Applicant: Hyundai Motor Company, Seoul (KR)

(72) Inventor: Kyunghyun Nam, Bongdong-eup (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/863,038

(22) Filed: Sep. 23, 2015

(65) Prior Publication Data

US 2016/0297367 A1 Oct. 13, 2016

(30) Foreign Application Priority Data

Apr. 13, 2015 (KR) ........................ 10-2015-0052012

(51) Int. Cl.
*B60R 3/02* (2006.01)
(52) U.S. Cl.
CPC ...................................... *B60R 3/02* (2013.01)
(58) Field of Classification Search
CPC ....................................................... B60R 3/02
See application file for complete search history.

(56) References Cited

U.S. PATENT DOCUMENTS

| 8,297,635 | B2* | 10/2012 | Agoncillo | B60R 3/02 |
| | | | | 280/163 |
| 2009/0184487 | A1* | 7/2009 | Kircher | A61G 3/061 |
| | | | | 280/166 |
| 2010/0044993 | A1* | 2/2010 | Watson | B60R 3/02 |
| | | | | 280/166 |

FOREIGN PATENT DOCUMENTS

| KR | 2002-0088280 A | 11/2002 |
| KR | 10-1262910 B1 | 5/2013 |

* cited by examiner

*Primary Examiner* — Erez Gurari
(74) *Attorney, Agent, or Firm* — Morgan Lewis & Bockius LLP (57) ABSTRACT

A step device may include a step housing having a box shape, guide rails mounted on both sides of the step housing, step rails coupled to the guide rails to move along the guide rails, and a scaffold coupled to the step rails and moving along the guide rails through the step rails to be received in the step housing or drawn to an outside of the step housing.

15 Claims, 6 Drawing Sheets

STEP DEVICE

CROSS-REFERENCE TO RELATED APPLICATION

The present application claims priority to Korean Patent Application No. 10-2015-0052012 filed Apr. 13, 2015, the entire contents of which is incorporated herein for all purposes by this reference.

BACKGROUND OF THE INVENTION

Field of the Invention

The present invention relates to a step device, and more particularly, to a step device which can be usefully used for a vehicle and is driven by an electric motor.

Description of Related Art

In the related art, a vehicle having a large height, such as a van or a multi-purpose vehicle (SUV, or the like) includes a step device so as for a passenger to easily get on and off.

When the passenger gets on or off the vehicle, the passenger can step on the step device with a foot to help the passenger get on and off.

The step device in the related art includes a fixed type in which the step device is fixedly mounted on a vehicle body and the fixed step device deteriorates an external aesthetic of the vehicle as a scaffold is fixedly installed in the vehicle body to protrude in the width direction of the vehicle and extend in the longitudinal direction of the vehicle from the vehicle body.

In order to solve the problem of the fixed step device, a movable or drawable step device that is received into the vehicle or protrudes to the outside of the vehicle as necessary have been developed.

In general, the movable step device facilitates getting-on/off of the passenger by drawing the scaffold to the outside of the vehicle when needed and improves the external aesthetic of the vehicle by receiving the scaffold into the vehicle when not needed, by using a drive source such as a motor.

The movable step device in the related art includes a guide mechanism including a step housing fixedly mounted on the vehicle body, a scaffold movably installed to be received into the step housing or drawn to the outside of the step housing, an electric motor as the drive source, which moves the scaffold, a rotary roller and a step rail promoting the movement of the scaffold by transferring actuation power of the electric motor to the scaffold, and the like.

However, in the movable step device in the related art, the rotary roller is installed on the step rail in a cantilever form, and as a result, durability is not satisfactory and the step rail is deployed to be separated outside the step housing, and as a result, it is disadvantageous in terms of a layout, and external foreign materials intrude through a separation space between the step housing and the step rail, thereby causing movement disabling or non-smooth movement of the scaffold.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a step device which is excellent in durability, effectively prevents intrusion of external foreign materials to promote smooth actuation, and is applied to a vehicle to allow a passenger to conveniently get on and off.

According to various aspects of the present invention, a step device may include a step housing having a box shape, guide rails mounted on both sides of the step housing, step rails coupled to the guide rails to move along the guide rails, and a scaffold coupled to the step rails and moving along the guide rails through the step rails to be received in the step housing or drawn to an outside of the step housing.

The step housing may have a quadrangular box shape of which both sides facing each other are open.

The step housing may be fixedly mounted on a vehicle body via a mounting bracket having an L-shape.

A hole may be formed on a top of the step housing and a power supply line may be inserted through the hole to supply external power into the step housing.

In the guide rail, an upper wall, and a first side wall and a lower wall may be integrally consecutively connected and a second side wall facing the first side wall may be opened, to form a consecutive channel in a longitudinal direction, and the step rail may be inserted into the channel to be guided.

A lower guide jaw which is uplifted in a height direction and on which the guide roller is seated to rollably move may be formed on a top in the height direction of the lower wall of the guide rail, and a guide surface which the guide roller closely contacts to rollably move may be formed on a bottom of the upper wall facing the top of the lower wall.

A drain path may be formed inside the channel around the lower guide jaw, a drain surface is formed outside the channel, and one or more through drain holes may be formed on the drain path.

The drain path may have a dented shape, and the drain surface may be inclined downward to the outside of the channel.

A step jaw which is stepped with respect to the guide surface may be formed on the bottom of the upper wall, and an extension flange which is suspended on the step jaw and a side of the guide jaw to restrict movement in a width direction may be provided at the guide roller.

The step rail may have a quadrangular box shape in which a length is larger than a width thereof, one or more assembly holes may be formed to pass through a top and a bottom in a height direction of the step rail at a predetermined interval in a longitudinal direction, and the guide roller may be inserted into the assembly hole to be rotatably fastened with an assembly pin.

A bush may be assembled by engaging in an outer periphery of the assembly pin.

Multiple fastening holes may be formed on the step rail at a predetermined interval in the longitudinal direction, the multiple fastening holes may be formed on both sides of the step rail, and a fastening pin may be inserted into each fastening hole to be integrally fixedly fastened to the scaffold.

The scaffold may have a quadrangular plate shape, and multiple reinforcing ribs may be formed to protrude from one side at a predetermined interval in the longitudinal direction of the scaffold.

Assembly bosses having an arc-shaped cross-section may be integrally formed at a portion of the multiple reinforcing ribs, and multiple fastening pins that pass through the step rail may be inserted into and fastened to the assembly bosses.

A plug that seals an inside of the step rail may be coupled to one fore-end of the step rail in a longitudinal direction while engaging in the step rail.

The guide roller, the step rail and the assembly pin may all be deployed in the guide rail.

According to various embodiments of the present invention, a guide rail and a step rail are received in a guide rail of a step housing and a step device thus has a compact structure, and as a result, it is advantageous in terms of a layout.

Since the guide roller is inserted into the step rail and an inner surface and an outer surface in the width direction can be supported by the step rail, durability can be improved.

As a fastening pin fastening the guide roller to the step rail and the guide roller are positioned in the guide rail, there is no concern that the guide roller will not smoothly operate due to intrusion of external foreign materials and there is no concern that the guide roller will not operate by freezing due to intrusion of moisture even in a cold weather.

A plug is mounted on one fore-end of the step rail in the longitudinal direction to block the inside and the outside of the step rail to effectively prevent the intrusion of the foreign materials into the step and improve external aesthetics.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
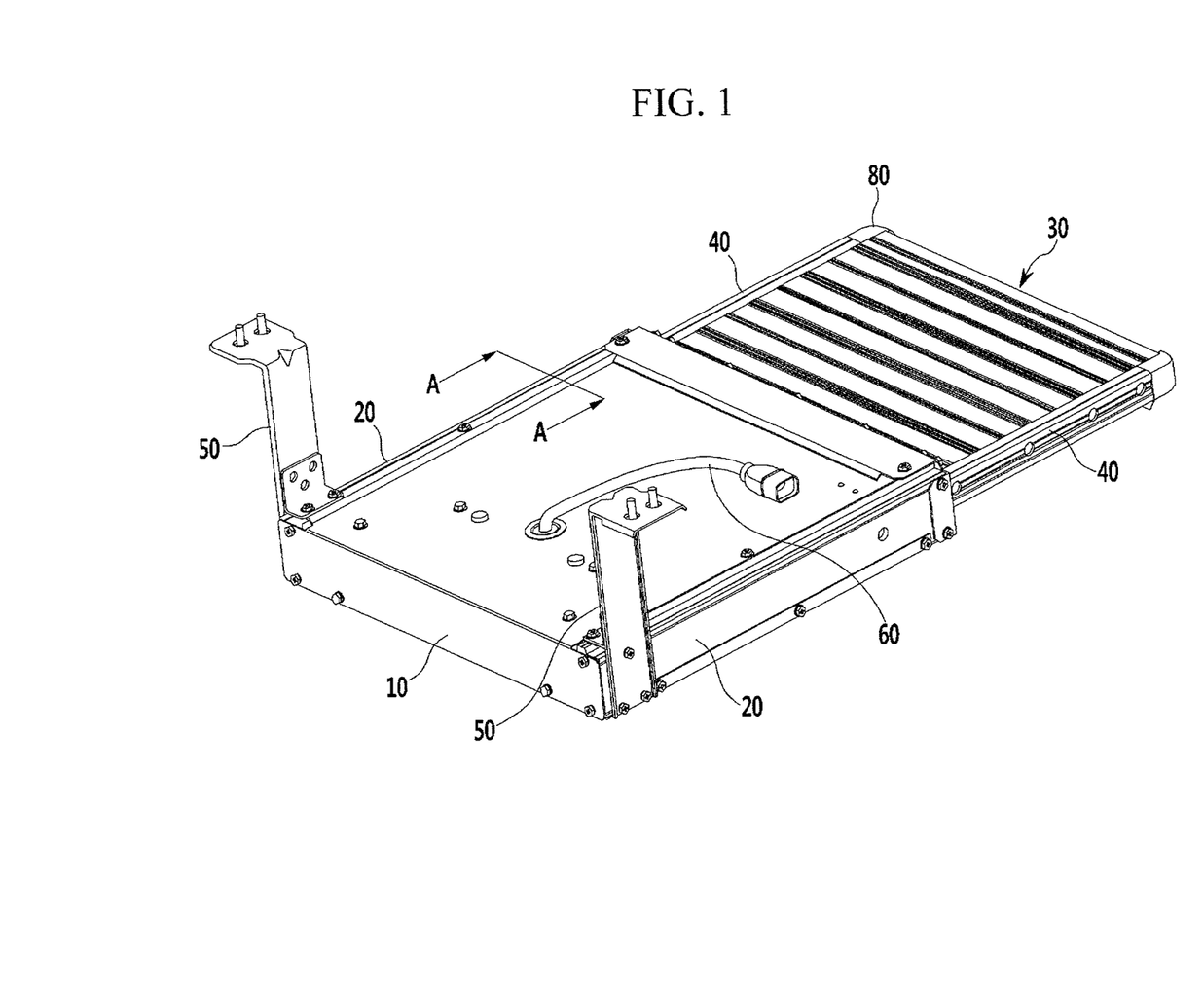
FIG. 1 is a perspective view of an exemplary step device according to the present invention.

Referring to FIG. 1, a step device according to various embodiments of the present invention may include a step housing 10 having a substantially quadrangular box shape, two guide rails 20 mounted on both opened sides of the step housing and deployed to face each other, a scaffold 30 movably installed to be received in the step housing 10 or drawn to the outside (the outside in the width direction of a vehicle) of the step housing 10, and step rails 40 coupled to both sides of the scaffold 30 and coupled to two guide rails 20, respectively to guide movement of the scaffold 30 along two guide rails 20.

The step housing 10 may, for example, be fixedly mounted on a vehicle body via a mounting bracket 50 having a substantially L-shape.

An electric motor may be incorporated in the step housing 10 and a hole is formed on the top of the step housing 10 and a power supply line 60 is inserted through the hole, and as a result, external power may be supplied to the electric motor installed in the step housing 10 through the power supply line 60.

Figure 2:
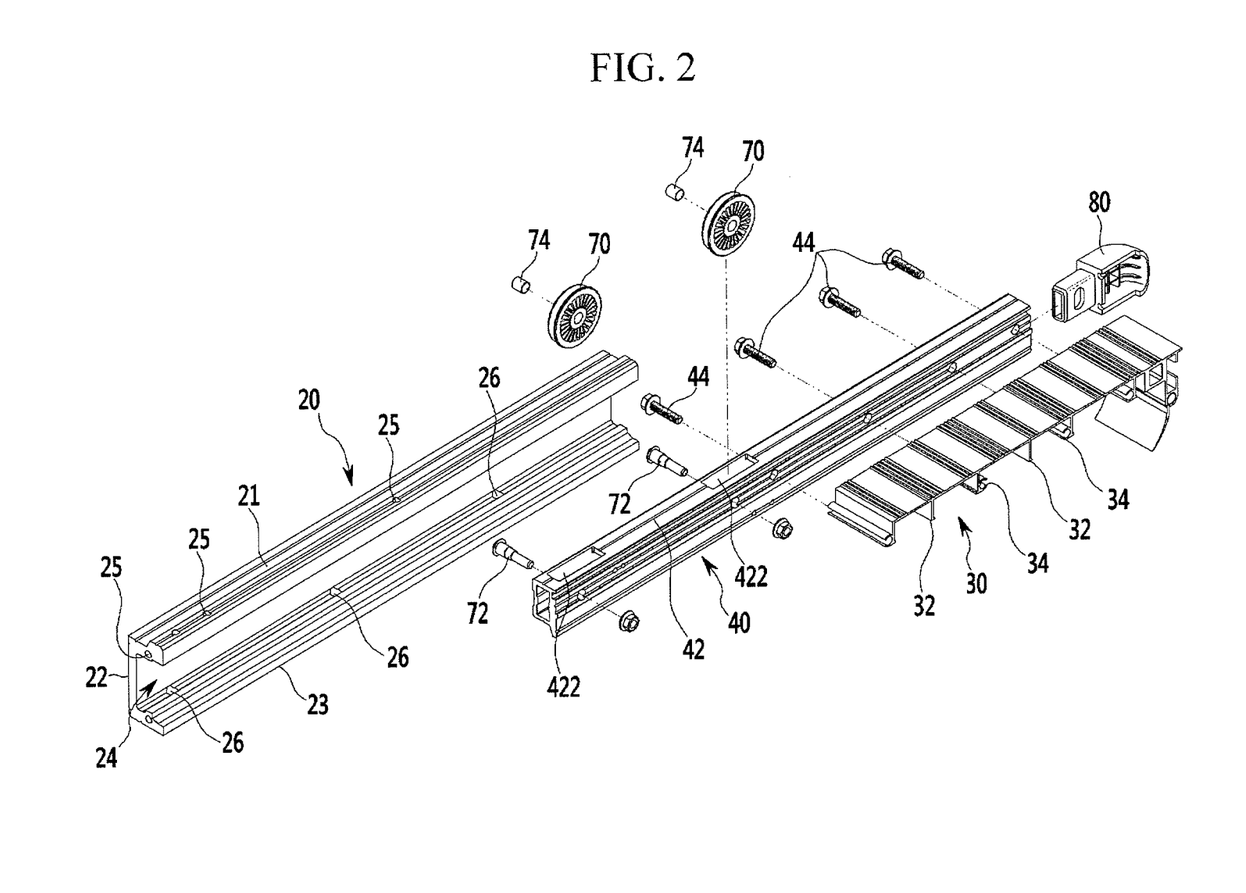
FIG. 2 is a partially exploded perspective view of the exemplary step device according to the present invention.

Referring to FIG. 2, the guide rail 20 may have a shape of a channel 24 having a substantially C-shaped cross-section in which an upper wall 21, and one side wall 22 and a lower wall 23 are integrally consecutively connected and the other side facing the one side wall 22 is opened.

Multiple fastening holes 25 for fastening the step housing 10 and a bolt, and the like may be formed on the upper wall 21 and the one side wall 22 and multiple through drain holes 26 may be formed on the lower wall 23 at a predetermined interval in the longitudinal direction.

Figure 4:
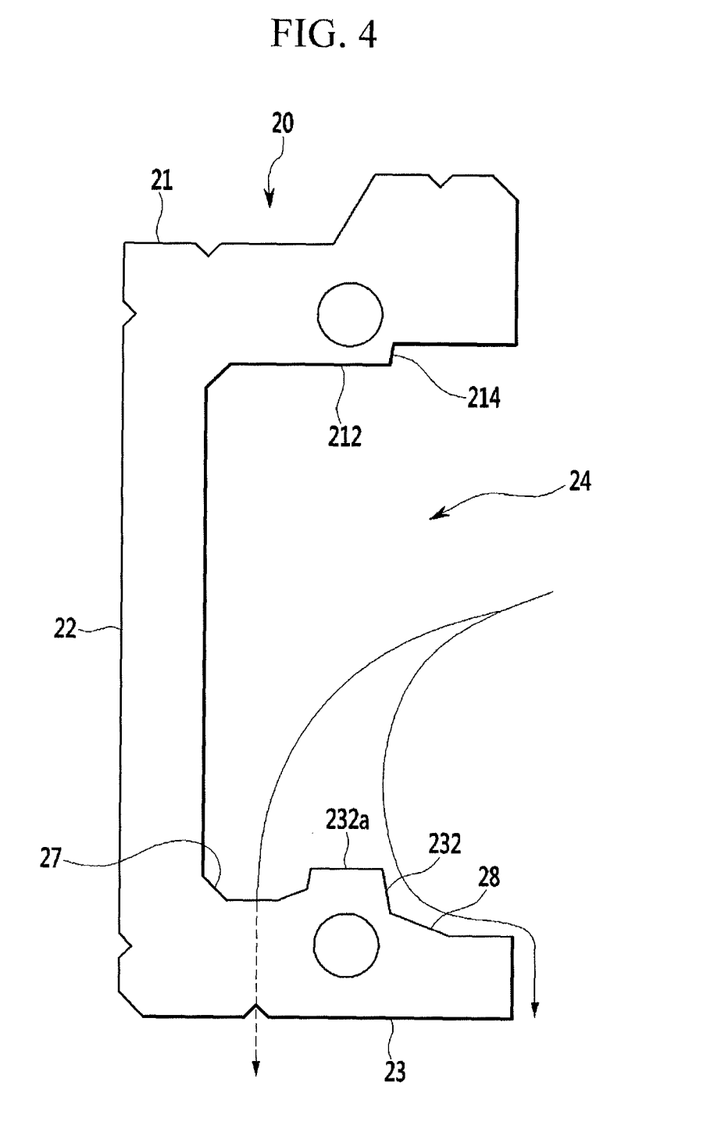
FIG. 4 is a cross-sectional view of a guide rail of the exemplary step device according to the present invention.
Figure 5:
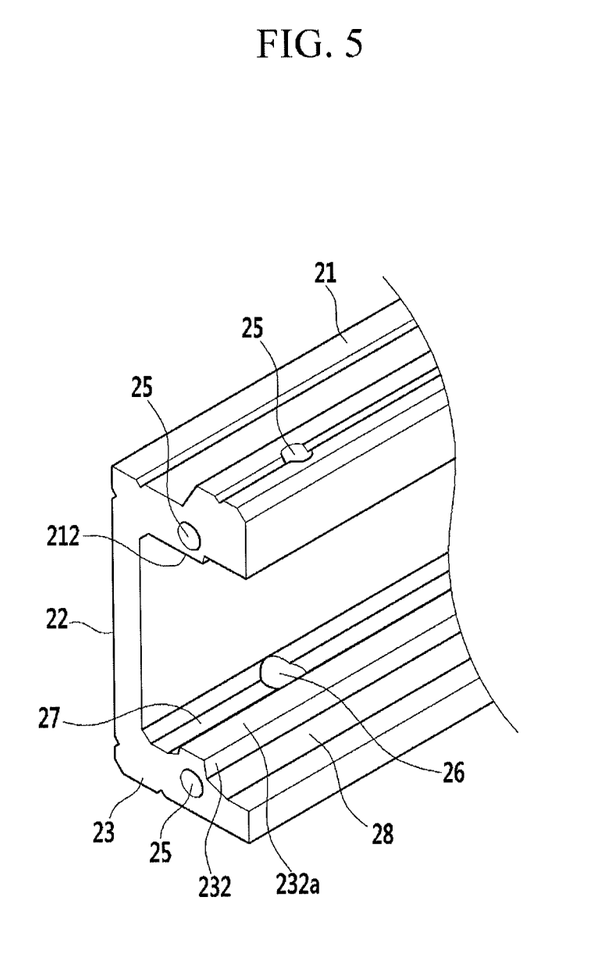
FIG. 5 is a partially cut perspective view of the guide rail according to the present invention.

Referring to FIGS. 4 and 5, a lower guide jaw 232 having a substantially quadrangular shape which is uplifted in the height direction may be formed on the top in the height direction of the lower wall 23 of the guide rail 20.

A guide roller 70 is seated on a flat upper surface 232a of the lower guide jaw 232 to rollably move.

A drain path 27 may be formed inside the channel around the lower guide jaw 232 and a drain surface 28 may be formed outside the channel 24.

The drain path 27 may have a dented shape so that foreign materials such as moisture, and the like stagnate and the drain surface 28 may be formed to be inclined downward outside the channel 24.

The drain hole 26 is formed in the drain path 27 to serve to discharge the moisture or the foreign materials which stagnate in the drain path 27 to the outside the channel as shown by an arrow and further, the drain surface 28 may also serve to discharge the foreign materials such as the moisture introduced into the channel to the outside of the channel by using a self weight.

A substantially flat guide surface 212 which the guide roller 70 rollably moves by closely contacting and a step jaw 214 which is stepped with respect to the guide surface 212 may be formed on the bottom of the upper wall 21 facing the top of the lower wall 23.

The step rail 40 may have a substantially quadrangular box shape in which the length is larger than the width.

Two assembly holes 422 may be formed to pass through the top 42 and the bottom in the height direction of the step rail 40 at a predetermined interval in the longitudinal direction.

The guide roller 70 is inserted into the assembly hole 422 to be rotatably fastened to the step rail 40 via an assembly pin 72.

A bush 74 engages in an outer periphery of the assembly pin 72 to facilitate rotation of the guide roller 70.

Multiple fastening holes may be formed on the step rail 40 at a predetermined interval in the longitudinal direction. The multiple fastening holes are formed on both sides of the step rail 40 and a fastening pin 44 is thus inserted into each fastening hole to be integrally fixedly fastened to the scaffold 30.

The scaffold 30 may have a quadrangular plate shape and multiple reinforcing ribs 32 may be formed to protrude from one side at a predetermined interval in the longitudinal direction of the scaffold 30.

Assembly bosses 34 having a substantially arc-shaped cross-section are integrally formed at some of the multiple reinforcing ribs 32, and multiple fastening pins 44 that pass through the step rail 40 are inserted into and fastened to the assembly bosses 34, and as a result, the step rail 40 and the scaffold 30 are fastened to each other.

A plug 80 may be coupled to one fore-end of the step rail 40 in the longitudinal direction, that is, an outside fore-end positioned at an outside in the width direction of the vehicle while engaging in the step rail 40.

The plug 80 may serve to prevent the external foreign materials from intruding into the step rail 40 by plugging and sealing an opening fore-end of the step rail 40 and improve an external aesthetic when the step rail 40 protrudes to the outside.

Figure 3:
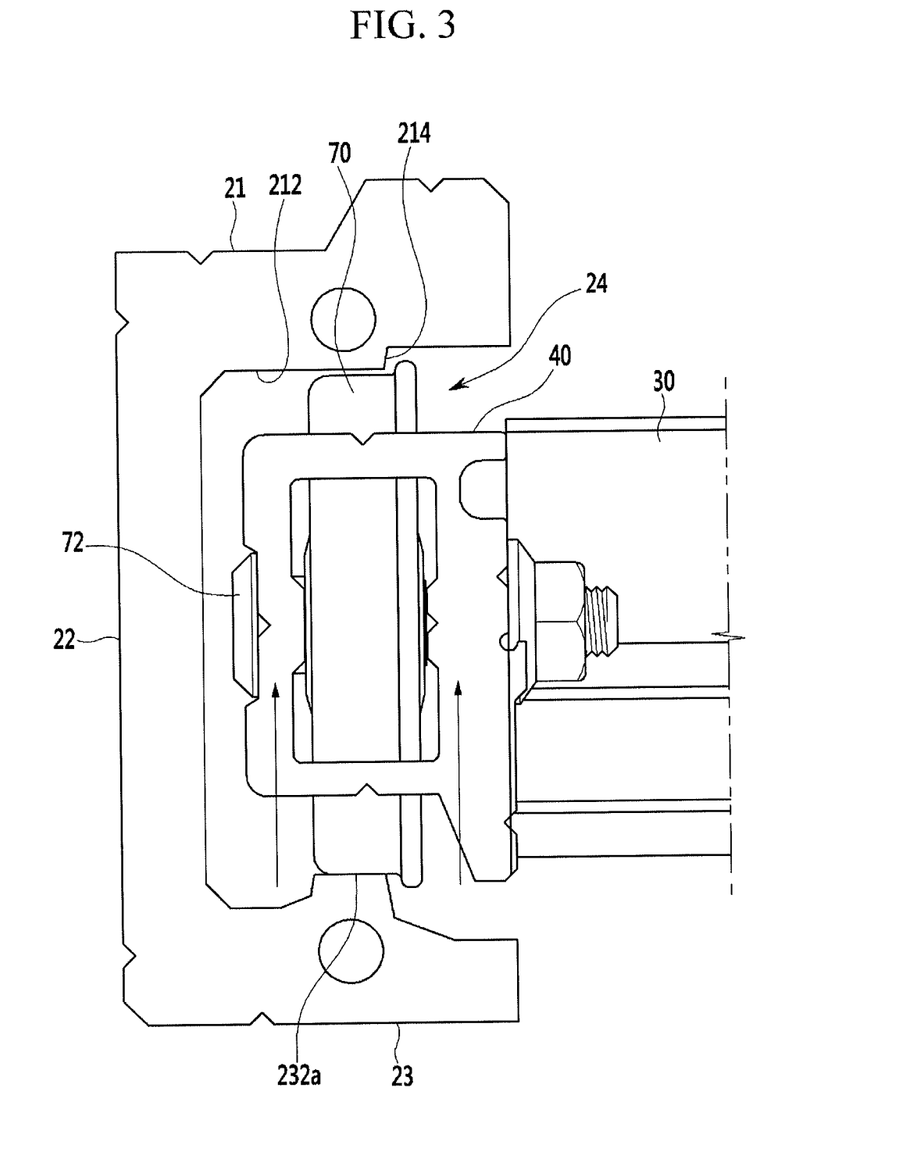
FIG. 3 is a cross-sectional view taken along line A-A of FIG. 1.

Referring to FIG. 3, when the guide roller 70 is inserted into the step 40 and fastened to the step rail 40 with the assembly pin 72, the assembly pin 72 penetrates both sides of the guide roller 70, and as a result, the guide roller 70 is supported at both sides in a load support structure as shown by an arrow, thereby improving durability.

Further, the guide roller 70, and the step rail 40 and the assembly pin 72 are all deployed in the channel 24 of the guide rail 20, and as a result, there is no concern that external foreign materials which intrudes in the channel 24 freezes sliding portions of the guide roller 70 and the assembly pin 72 or obstructs a rolling motion of the guide roller 70 and it is advantageous even in terms of a layout.

Figure 6:
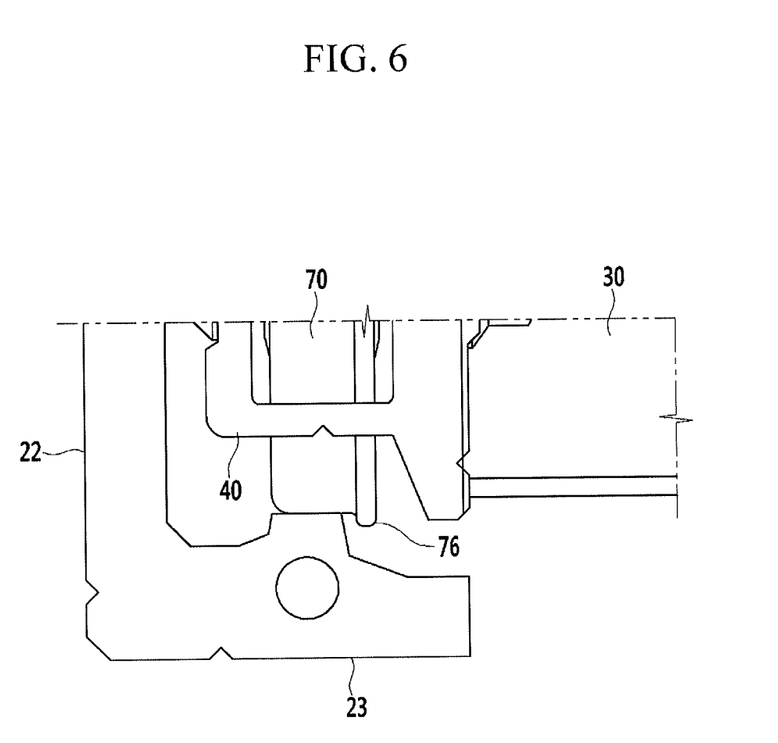
FIG. 6 is a bottom cross-sectional view of a state in which a guide roller of the exemplary step device is seated on the guide rail according to the present invention.

As illustrated in FIGS. 3 and 6, a flange 76 extended outward in the diameter direction is formed at the guide roller 70 and the flange 76 is suspended on a step jaw 214 and a guide jaw 232 of the guide rail 20 to restrict movement of the guide roller 70, and the step rail 40 and the scaffold 30 in the axial direction of the assembly pin 72, and as a result, stable and smooth stretching (drawn outward in the width direction of the vehicle) and contraction (received in the step housing) motions of the scaffold 30 may be smoothly achieved.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A step device comprising:
a step housing having a box shape;
guide rails mounted on both sides of the step housing;
step rails coupled to the guide rails to move along the guide rails; and
a scaffold coupled to the step rails and moving along the guide rails through the step rails to be received in the step housing or drawn to an outside of the step housing,
wherein in the guide rails, an upper wall, a first side wall and a lower wall are integrally consecutively connected and a second side wall facing the first side wall is opened, to form a consecutive channel in a longitudinal direction,
wherein a drain path is formed inside the channel around a lower guide jaw,
wherein a drain surface is formed outside the channel,
wherein the drain path has a dented shape, and
wherein the drain surface is inclined downward to the outside of the channel.

2. The step device of claim 1, wherein the step housing has a quadrangular box shape.

3. The step device of claim 1, wherein the step housing is fixedly mounted on a vehicle body via a mounting bracket having an L-shape.

4. The step device of claim 1, wherein a hole is formed on a top of the step housing and a power supply line is inserted through the hole to supply external power into the step housing.

5. The step device of claim 1, wherein:
the step rails are inserted into the channel to be guided.

6. The step device of claim 5, wherein:
the lower guide jaw which is uplifted in a height direction and on which a guide roller is seated to rollably move is formed on a top in the height direction of the lower wall of the guide rail, and
a guide surface which the guide roller closely contacts to rollably move is formed on a bottom of the upper wall facing the top of the lower wall.

7. The step device of claim 6, wherein:
one or more through drain holes are formed on the drain path.

8. The step device of claim 6, wherein:
a step jaw which is stepped with respect to the guide surface is formed on the bottom of the upper wall, and
an extension flange which is suspended on the step jaw and a side of the guide jaw to restrict movement in a width direction is provided at the guide roller.

9. The step device of claim 1, wherein:
the step rail has a quadrangular box shape in which a length is larger than a width thereof,
one or more assembly holes are formed to pass through a top and a bottom in a height direction of the step rail at a predetermined interval in a longitudinal direction, and
a guide roller is inserted into each assembly hole to be rotatably fastened with an assembly pin.

10. The step device of claim 9, wherein a bush is assembled by engaging in an outer periphery of the assembly pin.

11. The step device of claim 9, wherein:
multiple fastening holes are formed on the step rail at a predetermined interval in the longitudinal direction,
the multiple fastening holes are formed on both sides of the step rail, and
a fastening pin is inserted into each fastening hole to be integrally fixedly fastened to the scaffold.

12. The step device of claim 11, wherein:
the scaffold has a quadrangular plate shape, and
multiple reinforcing ribs are formed to protrude from one side at a predetermined interval in the longitudinal direction of the scaffold.

13. The step device of claim 12, wherein:
assembly bosses having an arc-shaped cross-section are integrally formed at a portion of the multiple reinforcing ribs, and
multiple fastening pins that pass through the step rail are inserted into and fastened to the assembly bosses.

14. The step device of claim 1, wherein a plug that seals an inside of the step rail is coupled to one fore-end of the step rail in a longitudinal direction while engaging in the step rail.

15. The step device of claim 9, wherein:
the guide roller, the step rail and the assembly pin are all deployed in the guide rail.

* * * * *